United States Patent Office 3,116,019
Patented Dec. 31, 1963

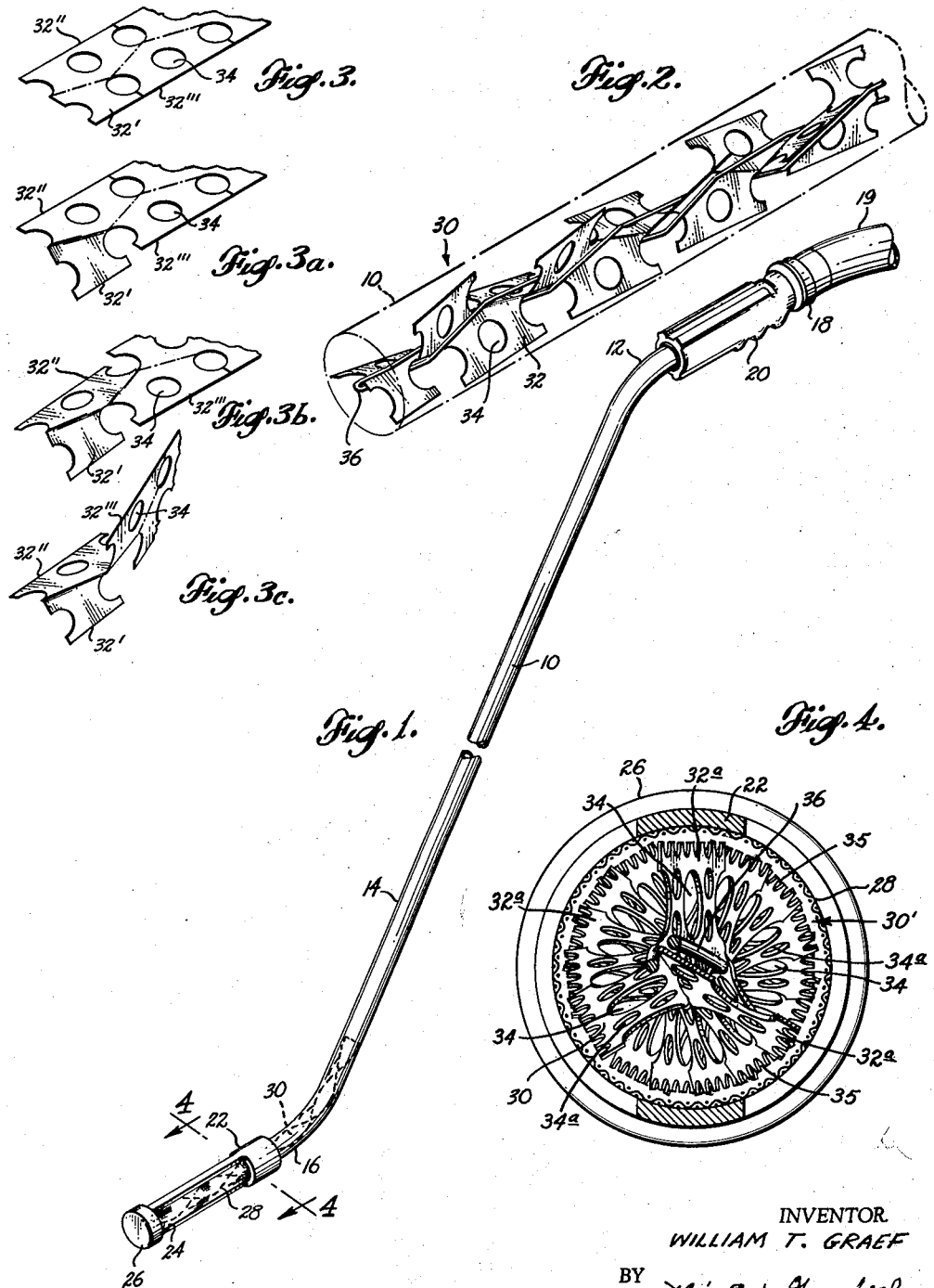

3,116,019
IRRIGATING ATTACHMENT FOR A
GARDEN HOSE
William T. Graef, 1212 5th Ave., Seattle, Wash.
Filed May 28, 1962, Ser. No. 198,223
4 Claims. (Cl. 239—542)

This invention relates to an irrigating attachment for a garden hose, and more particularly to an irrigating attachment which reduces the hose pressure to substantially no pressure or to such a low pressure that no adverse soil disturbance or erosion occurs. The principal object of this invention is to provide a new and improved device of this type.

When irrigating many types of plants it is desirable to apply the water to the base of the plant so as to not wet the plant leaves as wetting of the leaves invites plant diseases. Also, if the water is applied to the base of the plant it will penetrate into the ground faster and will reach the root area of the plant in a shorter amount of time than would be the case if the plant were sprayed by means of a conventional hose nozzle. However, before the water can be applied to the base of the plant its pressure must be substantially reduced or else the force of the water will erode away the soil and expose the roots. Various devices have been proposed for reducing the water pressure in order to eliminate such soil erosion. However, each of these devices have been relatively complex and costly to manufacture with a resulting high cost to the consumer. The irrigating attachment of this invention is an improvement over any known device for similar purposes in that it is relatively simple in construction and may be conveniently and economically manufactured from readily available materials and at the same time is efficient in operation.

It is an object of this invention to provide an irrigating attachment for a garden hose which will fully and efficiently water the most delicate plants, flower beds, shrubs, etc. without washing away the soil.

It is a further object of this invention to provide an improved irrigating attachment which fits all standard garden hoses and which is constructed solely from standard materials such as pipe, pipe fittings, screen, etc. which are readily available on the open market, thus eliminating the need of a special manufacturing apparatus.

A still further object of the invention is to provide an improved garden hose irrigating attachment having a construction which allows the user to stand erect while applying water to plants at their bases.

Other objects and advantages will be apparent from the following description, appended claims and annexed drawing.

Referring to the drawing wherein like reference characters designate like parts throughout the several views:

FIG. 1 is a perspective view, with a portion of the tubular body broken away, of the irrigating attachment showing the relationship of its several parts and its general configuration;

FIG. 2 is a perspective view of one form of pressure reducing baffle of the invention;

FIGS. 3, 3a, 3b, and 3c illustrate the step-by-step construction of the pressure reducing baffle of FIG. 2;

FIG. 4 is a sectional view taken along lines 4—4 of FIG. 1, and showing in detail the relationship of the pressure reducing insert, but shown in slightly modified form, with respect to the tubular screen insert and the discharge openings of the discharge section.

Referring now to FIG. 1, the irrigating attachment of this invention has a tubular body 10 consisting of an upper end portion 12, a central portion 14 and a lower end portion 16. The body portion 10 is configured so that while the attachment is being used the upper end portion 12 and the lower end portion 16 extend generally horizontally and the central portion 14 is downwardly inclined. This configuration allows the user to stand erect while applying water to the base of a plant.

A threaded hose coupling 18 is secured to the upper end portion 12 in a manner conventional per se, e.g. as by flanging of the tube for attaching the attachment to a conventional garden hose 19 in the usual manner. The upper end portion 12 forms the handle for the attachment, and it may be left bare, or it may be provided with the hand grip 20 as shown in the drawing.

At its lower end portion 16 the attachment is provided with a discharge portion 22 fashioned from a piece of pipe or tubing having an inside diameter which is substantially equal to the outside diameter of the tubular body 10. Discharge portion 22 fits over and is in tight engagement with lower end portion 16 of the tubular body 10. In addition to the tight fit and in order to assure a solid connection the joint may be provided with a coat of bonding cement or other suitable fastening means such as by welding. Discharge portion 22 is pictured as having two opposed discharge openings 24 which are rather long and narrow. Of course, the number of discharge openings and the shape of the openings are not critical features, but rather any suitable number of discharge openings, and any desired shape of the discharge openings can be used.

An imperforate closure cap 26 slides over and is in tight engagement with the downstream end of discharge portion 22. As can best be seen in FIG. 4, a cylindrical screen insert 28 snugly fits within discharge portion 22 and provides an exposed screen surface across each of the discharge openings 24.

Snugly fitting within the lower end of the attachment including the full length of discharge portion 22 is a helical baffle element 30 for producing pressure reducing turbulence in the water. FIG. 2 shows the pressure reducing insert 30 as it appears in place inside body portion 10. The insert 30 has a plurality of perforated projections 32 extending generally radially outward from and at an angle to its longitudinal center. Such projections 32 are oriented in a manner defining three generally helical longitudinal flow paths through the insert 30. Each projection 32 is provided with at least one perforation 34. The generally helical flow paths, the broken or staggered arrangement of projections 32, perforations 34, and the change in direction of flow at the outlet together cooperate to produce turbulence in the water, which results in a reduction of the water pressure. The amount of pressure reduction varies in accordance with the length of baffle 30, and it has been found that a baffle length of about eighteen inches produces sufficient pressure reduction for most water systems. Baffle 30 is reinforced by means of reinforcing wires 36 which interlace the projections 32.

Turning now to FIGS. 3, 3a, 3b and 3c, the manner of fabricating baffle 30 will be explained. For sake of example, the dimensions of the material used for making a baffle which fits a pipe having a 5/8 inch inside diameter will be given. FIG. 3 shows a flat strip of perforated sheet metal which is preferably light gage aluminum. The strip is approximately 5/8 inch wide and the perforations 34 along each side are approximately 5/16 inch on center. The first step is to slit the perforations 34 in the manner illustrated in FIG. 3 so as to divide the strip into a series of sections which will eventually become the projections 32. Section 32' is bent along the line indicated so that its extends below and to a slight angle with respect to the horizontal. On the other side of the strip, section 32" is bent along the lines indicated until it extends at an angle of 120° with respect to section 32′, and section 32′″ is turned upward until it extends approximately 120° with respect to both sections 32′ and 32″. This bending process is repeated throughout the full length of the strip, resulting in the baffle structure shown by FIG. 2. Baffle 30 is easily and conveniently inserted into the lower end of the attachment and is held in place by the friction contact of projections 32 with the inside wall.

The baffle 30′ shown in FIG. 4 is of a slightly modified form (compared to baffle 30 shown in FIGS. 2, 3, 3a, 3b, and 3c) in that the projections 32a include, in addition to the relatively large openings 34, a plurality of smaller openings, some of which are designated 34a in FIG. 4, and a plurality of edge scallops, some of which are designated 35 in such figure. The showing of the two forms of pressure reducing baffle illustrates that the number, size, and shape, and relative arrangement of the perforations in the projections 34, 32a may vary from one installation to the next.

As can readily be seen, each of the materials used in the construction of the irrigating attachment of this invention are standard materials which are readily available at most any hardware or building product supply. For example, body portion 10 may be formed from a piece of ¾″ O.D. x 0.049″ thin walled aluminum tubing, for which there is available a hose attachment which can be easily flanged onto its hose attaching end. Handle grip 20 can be made by merely cutting a hole in the closed end of a conventional bicycle hand grip and sliding the same onto the upper end of the attachment prior to flanging on the hose attachment. The discharge portion 22 may be fashioned from a short length of ⅞″ O.D. x 0.049″ thin walled aluminum tubing, and the tubular screen insert 28 may be easily constructed from a piece of stiff fine mesh wire screen or from a piece of finely perforated sheet aluminum. Cap 26 is a conventional accessory found in connection with aluminum tubing.

As can readily be appreciated, the irrigating attachment of this invention can be easily and economically manufactured allowing it to be marketed at a relatively low cost to consumer.

From the foregoing, further variations, modifications, adaptations and usages of the irrigating attachment will be apparent, within the scope of the following claims.

What is claimed is:

1. An irrigating device including a tubular conduit having water inlet means; water outlet means; and a pressure reducing baffle positioned therein between said inlet and outlet means, said baffle comprising a plurality of substantially flat, perforated projections connected along a longitudinal center line and extending in a general helical pattern around said center line, said projections defining with the cylindrical conduit a plurality of generally helical flow paths; and a reinforcing wire interlacing the said projections substantially at said longitudinal center line.

2. An irrigating attachment for a garden hose comprising in combination: a tubular body having an upstream end portion and a downstream end portion; a hose attachment secured to the upstream end portion, a discharge section secured to the downstream end portion, closed at its downstream end and having side discharge openings; a tubular screen insert for said discharge section providing exposed screen surfaces across said discharge openings; and an elongated pressure reducing baffle positioned in said tubular body and in said tubular screen, said baffle comprising a plurality of substantially flat, perforated projections longitudinally aligned relative to said tubular body and connected along a longitudinal center line and extending in a generally helical pattern around said center line, said projections defining with said tubular body and with said tubular screen a plurality of generally helical flow patterns.

3. An irrigating device in accordance with claim 2, wherein each projection occupies a substantially radially extending plane and each such plane is separated from each adjacent plane by an angle of approximately 120°, said projections defining with said tubular body and said tubular screen three generally helical flow paths.

4. An irrigation device in accordance with claim 2, wherein each projection has a substantially rectangular configuration.

References Cited in the file of this patent
UNITED STATES PATENTS

| | | |
|---|---|---|
| 2,146,205 | Edwards et al. | Feb. 7, 1939 |
| 2,224,450 | Scofield | Dec. 10, 1940 |
| 2,230,320 | Cockrill | Feb. 4, 1941 |
| 2,420,958 | Landreth | May 20, 1947 |
| 2,515,600 | Hayes | July 18, 1950 |
| 2,562,328 | Null | July 31, 1951 |
| 2,586,145 | Brewer | Feb. 19, 1952 |
| 2,655,408 | Williams | Oct. 13, 1953 |
| 3,016,202 | Zalewski | Jan. 9, 1962 |

FOREIGN PATENTS

| | | |
|---|---|---|
| 689,547 | Great Britain | Apr. 1, 1953 |